E. M. ARENA.
PIPE COUPLING.
APPLICATION FILED AUG. 25, 1914.
1,204,728.
Patented Nov. 14, 1916.
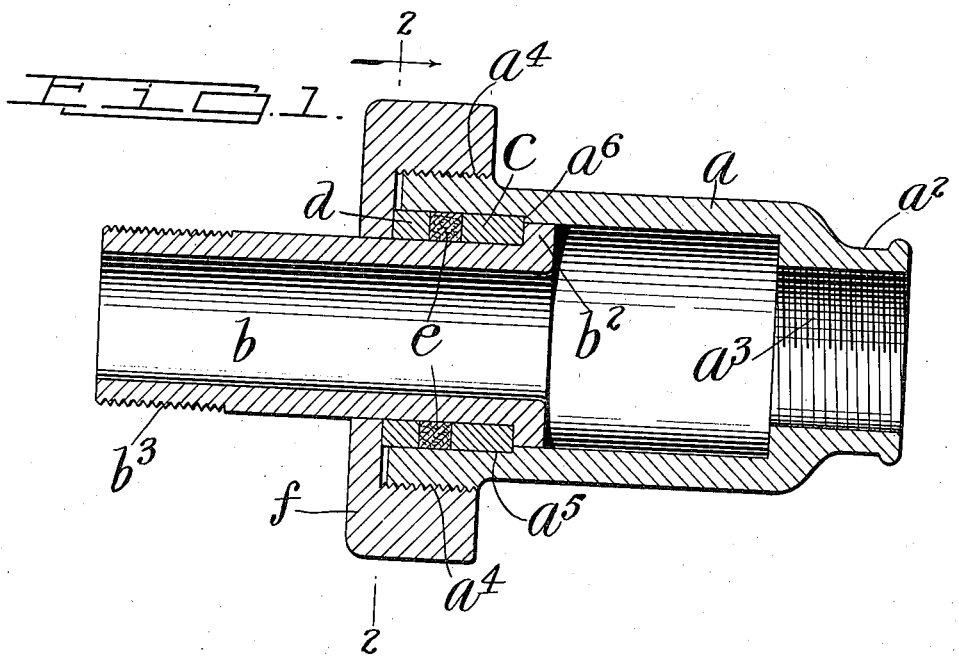
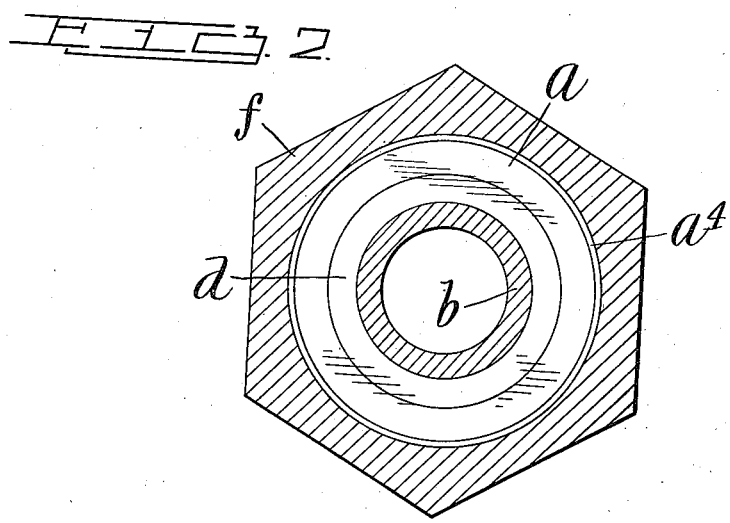
Witnesses:
H. E. Thompson.
E. Chesler.
Inventor
Ernest M. Arena,
By his Attorney
Edgar Tate Ho.

UNITED STATES PATENT OFFICE.

ERNEST M. ARENA, OF BROOKLYN, NEW YORK.

PIPE-COUPLING.

1,204,728.  Specification of Letters Patent.  Patented Nov. 14, 1916.

Application filed August 25, 1914. Serial No. 858,422.

*To all whom it may concern:*

Be it known that I, ERNEST M. ARENA, a citizen of the United States, and residing at Brooklyn, in the county of Kings and State of New York, have invented certain new and useful Improvements in Pipe-Couplings, of which the following is a specification, such as will enable those skilled in the art to which it appertains to make and use the same.

This invention relates to couplings for pipes of various kinds and classes and particularly of what are known as extension or slip couplings and the object thereof is to provide an improved device of this class which is simple in construction and the operation of which will effectually seal water pipes, gas pipes, steam pipes or other pipes connected therewith or thereby.

The invention is fully disclosed in the following specification, of which the accompanying drawing forms a part, in which the separate parts of my improvement are designated by suitable reference characters in each of the views, and in which:—

Figure 1 is a central, longitudinal section of my improved pipe coupling, and;—Fig. 2 a cross section on the line 2—2 of Fig. 1.

In the practice of my invention, I provide a main tubular coupling member $a$ one end of which is provided with a reduced extension $a^2$ having an interior thread $a^3$ and into which one section of a pipe may be screwed. The other end of the main coupling member $a$ is provided with an exterior thread $a^4$ and inserted thereinto is a supplemental tubular coupling member $b$ provided at its inner end with an annular flange $b^2$.

The coupling member $b$ is smaller than the coupling member $a$ and placed between said parts are metallic packing rings $c$ and $d$ between which is placed an annular packing member $e$ of fiber or other suitable material.

In the construction shown, the inner dimensions of the screw threaded end of the main coupling member $a$ are slightly enlarged as shown at $a^5$ and this forms an annular shoulder $a^6$ which corresponds with the annular shoulder formed by the flange $b^2$ of the coupling member $b$ and the longitudinal dimensions of the packing rings or members $c$, $d$ and $e$ in their normal condition is greater than the corresponding dimensions of the space between the threaded end part of the main coupling member $a$ and the inner end portion of the coupling member $b$ and when said packing members $c$, $d$, and $e$ have been placed in position, a cap $f$ is screwed onto the threaded end portion of the main coupling member $a$, and when this cap is screwed fully home the packing member $e$ will be firmly compressed between the packing members $c$ and $d$, as will be readily understood, and this makes a perfectly tight joint between said coupling members $a$ and $b$ while at the same time permitting the coupling member $b$ to slide with more or less freedom in the coupling member $a$.

The outer end of the coupling member $b$ in the form of construction shown, is threaded as shown at $b^3$ and in practice a pipe may be screwed thereto as will be readily understood and this pipe may correspond in dimensions with the pipe screwed into the end portion $a^2$ of the coupling member $a$.

My improved pipe coupling may be used wherever devices of this class are required, and while I have shown and described the details of the construction which I prefer, my invention is not limited thereto, and changes therein and modifications thereof may be made, within the scope of the appended claims, without departing from the spirit of my invention or sacrificing its advantages.

Having fully described my invention, what I claim as new and desire to secure by Letters Patent is:—

1. A slip pipe coupling device comprising a main tubular member provided near one end with external screw threads, the inner surface of said member being recessed for a portion of its length to form an annular shoulder, a supplemental tubular member inserted in the externally threaded end of the main tubular member and provided at its inner end with an annular projecting flange which slidably engages a portion of the inner surface of the main member, the recessed portion of the main member and the inserted portion of the supplemental member forming an annular packing chamber, a metallic packing ring provided in said chamber and engaging said annular shoulder, a fiber packing ring provided in said chamber and engaging said metallic ring, a second metallic ring arranged in the chamber and abutting against the fiber ring, and a screw threaded cap screwed onto the threaded end of the main tubular member and through which the supplemental member is freely movable, said cap being also adapted to compress said packings.

2. A slip pipe coupling device comprising a main tubular member provided near one end with external screw threads, the inner surface of said member being recessed for a portion of its length to form an annular shoulder, a supplemental tubular member inserted in the externally threaded end of the main tubular member and provided at its inner end with an annular projecting flange which slidably engages a portion of the inner surface of the main member, the recessed portion of the main member and the inserted portion of the supplemental member forming an annular packing chamber, a metallic packing ring provided in said chamber having a surface co-extensive with the shoulder and the flange and engaging said annular shoulder, a fiber packing ring provided in said chamber and engaging said metallic ring, a second metallic ring arranged in the chamber and abutting against the fiber ring, and a screw threaded cap screwed onto the threaded end of the main tubular member and through which the supplemental member is freely movable, said cap being also adapted to compress said packings.

In testimony that I claim the foregoing as my invention I have signed my name in presence of the subscribing witnesses this 22nd day of August 1914.

ERNEST M. ARENA.

Witnesses:
C. MULREANY,
H. E. THOMPSON.